United States Patent
Johnson, Sr.

(10) Patent No.: US 10,768,510 B2
(45) Date of Patent: *Sep. 8, 2020

(54) PANORAMIC CAMERA MOUNT

(71) Applicant: Really Right Stuff, LLC, Lehi, UT (US)

(72) Inventor: Joseph M. Johnson, Sr., Lehi, UT (US)

(73) Assignee: Really Right Stuff, LLC, Lehi, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/731,513

(22) Filed: Dec. 31, 2019

(65) Prior Publication Data

US 2020/0133102 A1   Apr. 30, 2020

Related U.S. Application Data

(63) Continuation of application No. 16/360,962, filed on Mar. 21, 2019, which is a continuation of application (Continued)

(51) Int. Cl.
| | |
|---|---|
| *G03B 17/56* | (2006.01) |
| *F16M 11/20* | (2006.01) |
| *F16M 11/04* | (2006.01) |
| *F16M 11/08* | (2006.01) |
| *F16M 11/16* | (2006.01) |

(Continued)

(52) U.S. Cl.
CPC ............ *G03B 17/561* (2013.01); *F16B 2/065* (2013.01); *F16M 11/02* (2013.01); *F16M 11/04* (2013.01); *F16M 11/041* (2013.01); *F16M 11/08* (2013.01); *F16M 11/16* (2013.01); *F16M 11/2078* (2013.01); *G03B 17/56* (2013.01); *G03B 17/566* (2013.01); *G03B 37/00* (2013.01); *F16M 2200/027* (2013.01)

(58) Field of Classification Search
None
See application file for complete search history.

(56) References Cited

U.S. PATENT DOCUMENTS

| | | | | |
|---|---|---|---|---|
| 2,556,598 A | * | 6/1951 | Rasine | F16M 11/10 248/179.1 |
| 2,791,950 A | * | 5/1957 | Oppenheimer | F16M 11/18 396/329 |

(Continued)

*Primary Examiner* — Nkeisha Smith
(74) *Attorney, Agent, or Firm* — Chernoff, Vilhauer, McClung & Stenzel, LLP

(57) ABSTRACT

A panoramic device includes a base member and a clamp member rotatably interconnected within a single plane of rotation with the base that includes a first rotatable knob to selectively inhibit the rotation of the clamp member with respect to the base. The upper surface includes a central region that is at a different elevation than another portion of the upper surface. The clamp includes a pair of opposed surfaces suitable to detachably secure a camera thereto. The one of the opposed surfaces is maintained in a fixed relationship with respect to the clamp member. The other one of the opposed surfaces is in a movable relationship with respect to the clamp member using a second rotatable knob. The first knob and the second knob are rotatably connected with respect to one another.

24 Claims, 12 Drawing Sheets

Related U.S. Application Data

No. 15/605,747, filed on May 25, 2017, now Pat. No. 10,281,803, application No. 16/360,962, which is a continuation of application No. 15/605,747, filed on May 25, 2017, now Pat. No. 10,281,803, which is a continuation of application No. 15/161,028, filed on May 20, 2016, now Pat. No. 9,696,611, which is a continuation of application No. 14/723,691, filed on May 28, 2015, now Pat. No. 9,372,385, which is a continuation of application No. 14/450,124, filed on Aug. 1, 2014, now Pat. No. 9,063,397, which is a continuation of application No. 13/569,055, filed on Aug. 7, 2012, now Pat. No. 8,827,576, which is a continuation of application No. 13/293,648, filed on Nov. 10, 2011, now Pat. No. 8,262,299, which is a continuation of application No. 12/655,419, filed on Dec. 29, 2009, now Pat. No. 8,075,203, which is a continuation of application No. 11/327,265, filed on Jan. 5, 2006, now Pat. No. 7,658,556.

(60) Provisional application No. 60/642,045, filed on Jan. 7, 2005.

(51) Int. Cl.
  *G03B 37/00* (2006.01)
  *F16M 11/02* (2006.01)
  *F16B 2/06* (2006.01)

(56) References Cited

U.S. PATENT DOCUMENTS

| | | | | |
|---|---|---|---|---|
| 2,823,003 A * | 2/1958 | Puggard | F16M 11/08 | 248/186.2 |
| 3,205,522 A * | 9/1965 | Then | A47J 45/02 | 15/146 |
| 3,356,325 A * | 12/1967 | Schnase | F16M 11/2021 | 248/187.1 |
| 4,083,480 A * | 4/1978 | Lee | F16M 13/04 | 224/185 |
| 4,451,020 A * | 5/1984 | Posso | F16M 11/105 | 248/183.3 |
| 4,526,308 A * | 7/1985 | Dovey | F16M 13/04 | 224/185 |
| 4,929,973 A * | 5/1990 | Nakatani | F16M 11/041 | 248/177.1 |
| 4,979,709 A * | 12/1990 | Ishikawa | F16M 11/041 | 248/187.1 |
| 5,078,355 A * | 1/1992 | Fujimoto | F16M 11/10 | 248/183.2 |
| 5,288,044 A * | 2/1994 | Chen | F16M 11/2014 | 248/183.1 |
| 5,397,086 A * | 3/1995 | Chen | F16M 11/10 | 248/183.2 |
| 5,737,657 A * | 4/1998 | Paddock | F16M 11/041 | 248/187.1 |
| 6,196,504 B1 * | 3/2001 | Lemke | F16M 11/041 | 248/187.1 |
| 6,435,738 B1 * | 8/2002 | Vogt | F16M 11/041 | 396/419 |
| 6,712,322 B2 * | 3/2004 | Nakatani | F16M 11/105 | 248/177.1 |
| 6,773,172 B1 * | 8/2004 | Johnson | F16M 11/041 | 248/187.1 |
| 6,827,319 B2 * | 12/2004 | Mayr | F16M 11/041 | 248/187.1 |
| 7,077,582 B2 * | 7/2006 | Johnson | F16M 11/041 | 396/428 |
| 7,185,862 B1 * | 3/2007 | Yang | F16M 11/041 | 248/187.1 |
| 7,658,556 B2 * | 2/2010 | Johnson | F16M 11/02 | 396/428 |
| 8,075,203 B2 * | 12/2011 | Johnson | F16M 11/02 | 396/428 |
| 8,191,838 B2 * | 6/2012 | Carter | B60R 11/02 | 16/367 |
| 8,262,299 B2 * | 9/2012 | Johnson | F16M 11/02 | 396/428 |
| 8,418,973 B2 * | 4/2013 | Liu | F16M 11/041 | 248/176.1 |
| 8,578,647 B2 * | 11/2013 | Storch | F41C 27/00 | 248/187.1 |
| 8,628,258 B2 * | 1/2014 | Vogt | F16M 11/105 | 396/428 |
| 8,783,973 B2 * | 7/2014 | Pizzo | G03B 17/00 | 248/187.1 |
| 8,794,575 B2 * | 8/2014 | Vogt | F16M 11/041 | 248/177.1 |
| 8,827,576 B2 * | 9/2014 | Johnson | F16M 11/02 | 396/428 |
| 8,827,577 B2 * | 9/2014 | Johnson | F16M 11/02 | 396/428 |
| 8,979,058 B2 * | 3/2015 | Li | F16M 11/041 | 248/181.1 |
| 9,004,419 B2 * | 4/2015 | Nakatani | F16M 11/10 | 248/178.1 |
| 9,062,818 B2 * | 6/2015 | Fan | F16M 11/04 | |
| 9,063,397 B2 * | 6/2015 | Johnson, Sr. | F16M 11/02 | |
| 9,303,940 B2 * | 4/2016 | Bonelli | F16M 11/14 | |
| 9,372,385 B2 * | 6/2016 | Johnson, Sr. | F16M 11/02 | |
| 9,417,508 B2 * | 8/2016 | Yang | F16M 11/041 | |
| 9,696,611 B2 * | 7/2017 | Johnson, Sr. | F16M 11/02 | |
| 2006/0175482 A1 * | 8/2006 | Johnson | F16M 11/14 | 248/176.1 |
| 2009/0101772 A1 * | 4/2009 | Bevirt | F16M 11/40 | 248/180.1 |
| 2010/0092165 A1 * | 4/2010 | Cartoni | F16M 11/10 | 396/428 |
| 2011/0006170 A1 * | 1/2011 | Liu | F16M 11/041 | 248/121 |
| 2011/0253860 A1 * | 10/2011 | Davidson | G01R 11/04 | 248/224.7 |
| 2015/0028171 A1 * | 1/2015 | Guidolin | F16M 11/043 | 248/178.1 |
| 2017/0114954 A1 * | 4/2017 | Zhao | F16M 11/06 | |

* cited by examiner

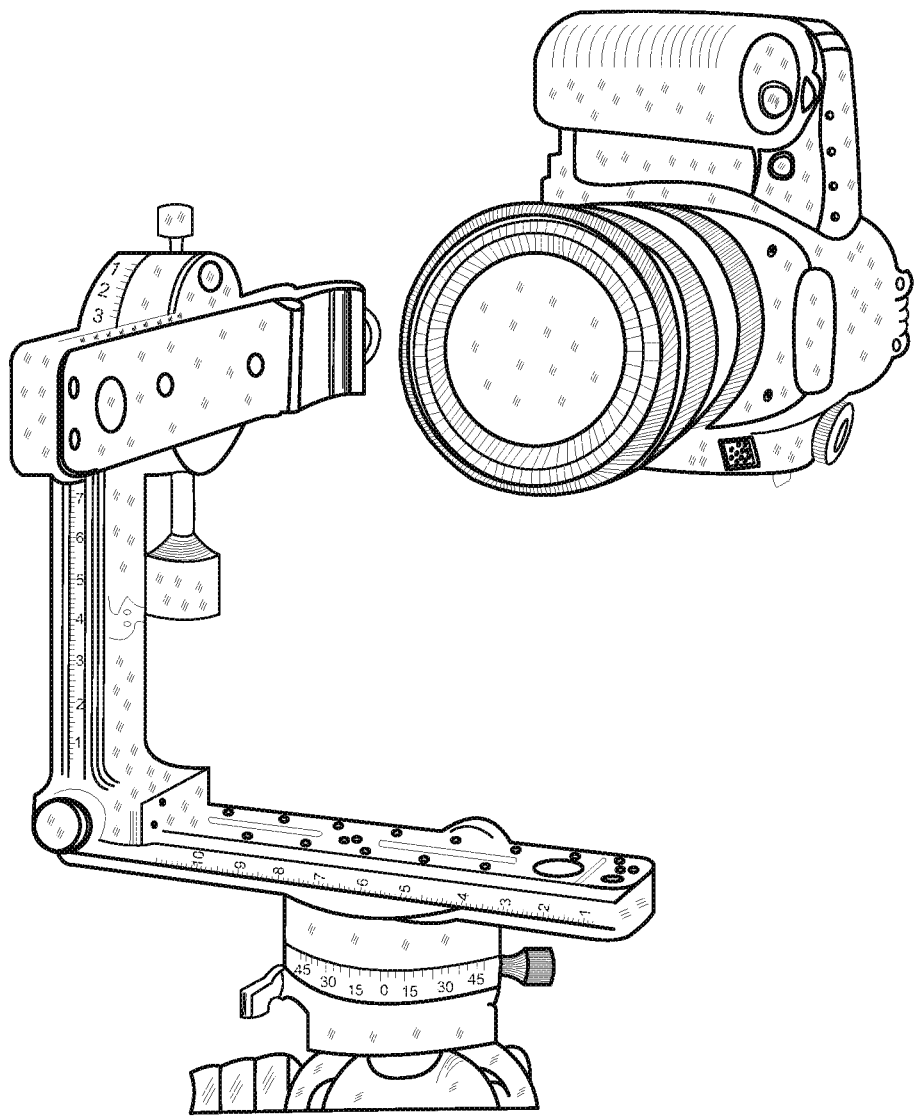
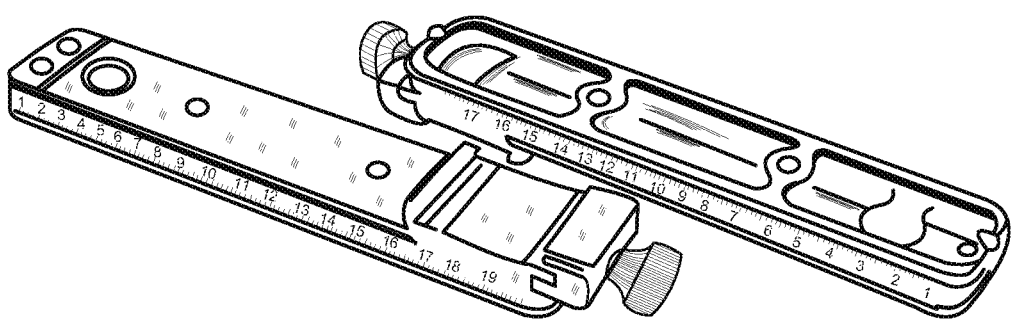
Fig. 12

PANORAMIC CAMERA MOUNT

CROSS-REFERENCE TO RELATED APPLICATIONS

This application is a continuation of U.S. patent application Ser. No. 16/360,962, filed Mar. 21, 2019, which application is a continuation of U.S. patent application Ser. No. 15/605,747, filed May 25, 2017, now U.S. Pat. No. 10,281,803, which application is a continuation of U.S. patent application Ser. No. 15/161,028, filed May 20, 2016, now U.S. Pat. No. 9,696,611, which application is a continuation of Ser. No. 14/723,691, filed May 28, 2015, now U.S. Pat. No. 9,372,385, which application is a continuation of U.S. patent application Ser. No. 14/450,124, filed Aug. 1, 2014, now U.S. Pat. No. 9,063,397, which application is a continuation of U.S. patent application Ser. No. 13/569,055, filed Aug. 7, 2012, now U.S. Pat. No. 8,827,576, which is a continuation of U.S. patent application Ser. No. 13/293,648, filed Nov. 10, 2011, now U.S. Pat. No. 8,262,299, which is a continuation of U.S. patent application Ser. No. 12/655,419, filed Dec. 29, 2009, now U.S. Pat. No. 8,075,203, which is a continuation of U.S. patent application Ser. No. 11/327,265, filed Jan. 5, 2006, now U.S. Pat. No. 7,658,556, which claims the benefit of U.S. Provisional App. No. 60/642,045, filed Jan. 7, 2005.

BACKGROUND OF THE INVENTION

The present invention generally relates to a camera mount, and in particular to a camera mount suitable for taking panoramic pictures.

Aberrations and distortions occur at the edge regions of a wide-angle view of a landscape. Taking and assembling together multiple images across the view results in a panoramic that is larger than is generally available using a single shot picture. Properly aligning film strips or digital images to produce a panoramic picture can be a difficult task. This task is especially difficult if the camera is not properly centered on a rotatable mount.

A panoramic camera is disclosed in Gasso et al., U.S. Pat. No. 2,111,854, that includes an adjustable lens to vary the focal length of the lenses in mathematical proportions to the varying distances of objects in the panoramic view.

Campbell et al., U.S. Pat. No. 3,183,810 disclose a motor-driven panoramic camera having automatic means for stopping the angular sweep of the camera and adjustments for changing the angle of sweep and for making the sweep symmetrical or unsymmetrical.

Blankenhorn, U.S. Pat. No. 1,282,177, discloses a system for making panoramic pictures comprising marking the film as the film is advanced and the camera rotated.

A camera mount useful for taking stereoscopic or panoramic pictures is disclosed by Ianuzzi in U.S. Pat. No. 2,782,700.

BRIEF DESCRIPTION OF THE SEVERAL VIEWS OF THE DRAWINGS

FIG. 12 illustrates a bracket.

DETAILED DESCRIPTION OF PREFERRED EMBODIMENT

For a vertical column of overlapping images, a panning clamp should have a vertical orientation. One technique to achieve this orientation is to mount a panning clamp on top of a tripod head or otherwise directly to a tripod. To more effectively use the panning clamp, the camera and lens should be mounted so that the camera and lens pivot around the nodal point or the entrance pupil. In most cases, this involves the camera and lens being backed off from the typical tripod mounting point so that the entrance pupil is located at the pivot point.

Figure 1:
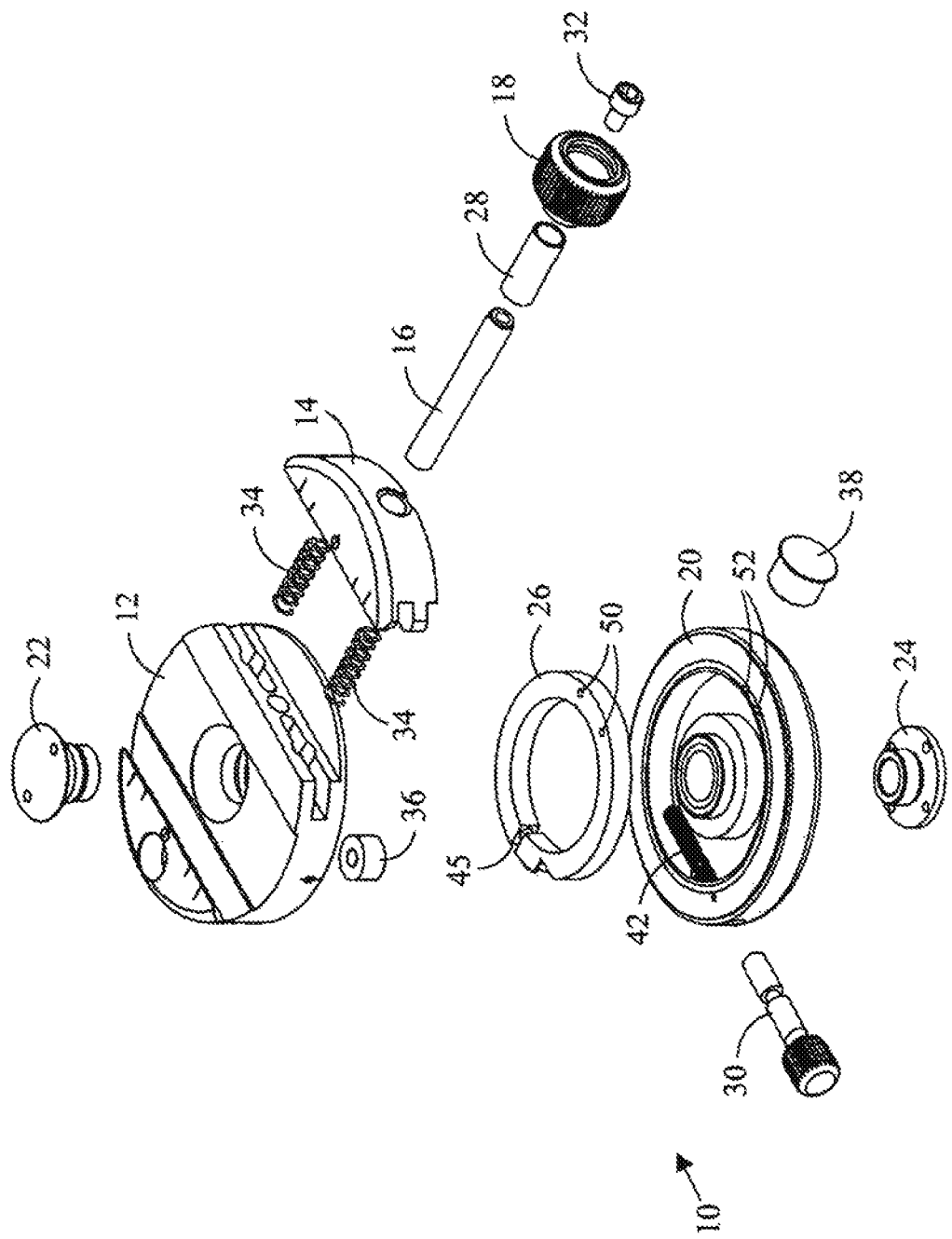
FIG. 1 illustrates an assembly drawing of a panning clamp.

Referring to FIG. 1, a panning clamp 10 includes a clamp body 12 and a clamp jaw 14. The clamp jaw 14 is engaged with the body 12 by a pair of clamp springs 34. The springs 34 exert an outwardly directed force on the clamp jaw 14. The clamp jaw 14 is secured in place by the combination of a clamp screw 16, a clamp sleeve 28 surrounding the clamp screw 16, a clamp knob 18, and a screw 32. The clamp sleeve 28 sets the spacing for the clamp knob 18 and presses against the exterior of the clamp jaw 14. As the clamp knob 18 is released the clamp jaw 14 will be pressed outwardly thereby opening the clamp and keeping the clamp jaw 14 in tension to maintain it in a suitable position. As the clamp knob 18 is tightened, the clamp jaw 14 will be pressed inwardly thereby closing the clamp and securing any plate or other imaging equipment (e.g., camera, video camera, etc.) therein. A plug 22 may be secured over the opening in the body 12. A plastic cover 38 may be secured over the end of the clamp knob 18.

In order to ensure that the top surface of the panning clamp 10 is level, a bubble level 36 may be included. The top of the bubble level 36 is preferably approximately flush with the upper surface of the panning clamp 10. With the panning clamp 10 attached to a support, such as a ball head, the panning clamp 10 is brought into a level position so that upon rotation an accurate set of panoramic images may be obtained.

A panning base 20 includes a recess therein into which supports a cinching ring 26. The cinching ring 26 may be secured to the panning base 20 by securing pins through a pair of openings 50 in the cinching ring 26 and a matching pair of openings 52 in the panning base 20. A cinching knob 30 attached to a stud 42 is engaged with a threaded gap 45 in the cinching ring 26. A retaining member 24 is secured to the plug 22 in such a manner to maintain the panning base and the body 12 together with the desired ability to freely rotate.

Figure 2:
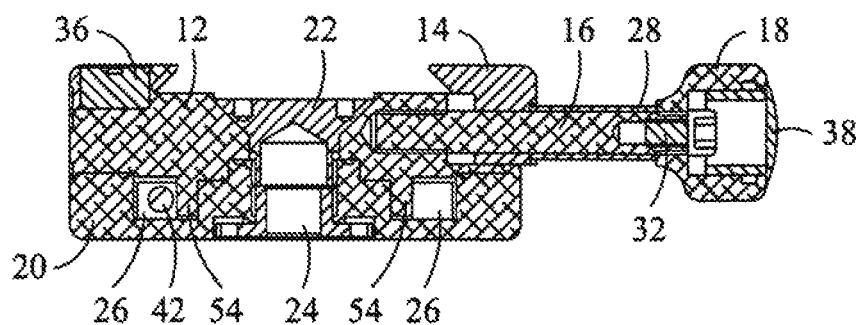
FIG. 2 illustrates a cut-away view along line C-C of FIG. 3.
Figure 3:
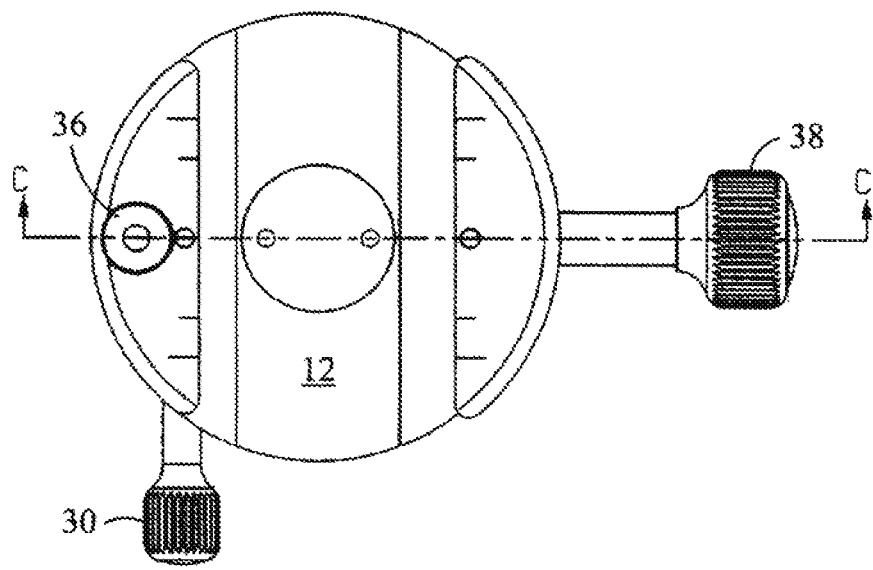
FIG. 3 illustrates a top view of an assembled panning clamp of FIG. 1

Referring also to FIG. 2, which is a section along line C-C of FIG. 3, the cinching ring 26 surrounds a lower portion 54 of the clamp body 14. When the user desires to permit free rotational motion of the clamp body 12 with respect to the panning base 20, the cinching knob 30 is released, which releases the cinching ring 26. When the user desires to inhibit free rotational motion of the clamp body 12 with respect to the panning base 20, the cinching knob 30 is tightened, which decreases the diameter of the cinching ring 26. The decreased diameter of the cinching ring 26 results in significant frictional engagement between the cinching ring 26 and the lower portion 54 of the clamp body 12. The cinching ring 26 and the lower portion 54 preferably have mating surfaces along 50% or more, 75% or more, or 90% or more of the circumference of the surfaces. This results in selective rotational movement of the panning clamp 10.

Figure 4:
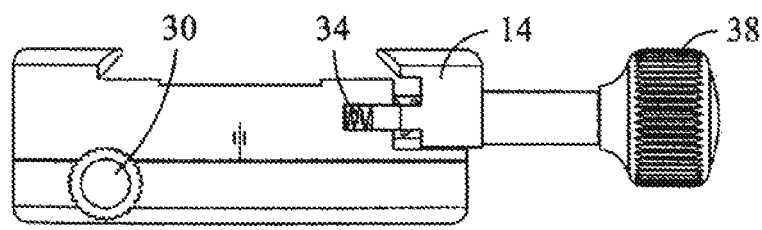
FIG. 4 illustrates a side view of an assembled panning clamp of FIG. 1.
Figure 5:
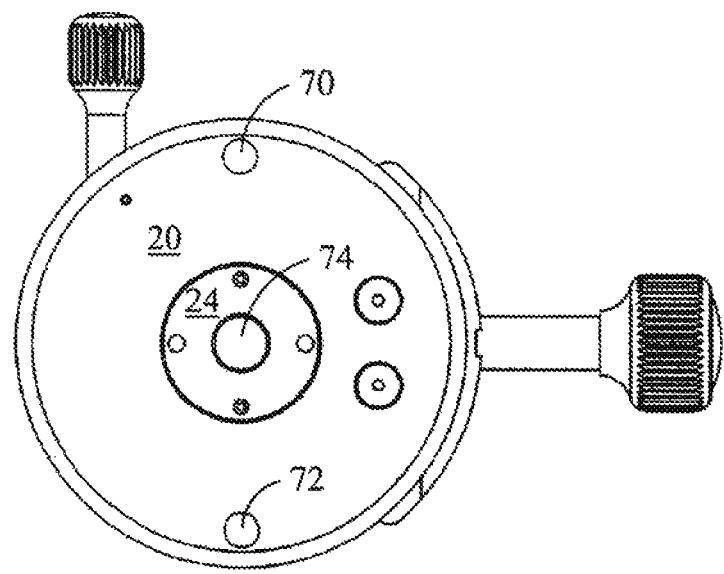
FIG. 5 illustrates a bottom view of an assembled panning clamp of FIG. 1.
Figure 6:
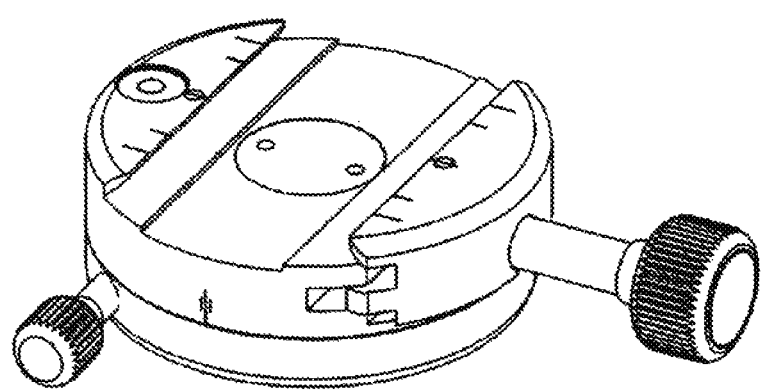
FIG. 6 illustrates a pictorial view of an assembled panning clamp of FIG. 1.

FIG. 4 illustrates a side view with the clamp jaw 14 extended by the springs 34. With the clamp jaw 14 retracted, a plate or other member may be readily inserted within the panning clamp 10. With the clamp jaw 14 engaged, the plate or other member is securely held in place within the panning clamp 10. FIG. 5 illustrates the base of the panning clamp 10 with a pair of threaded openings 70 and 72 suitable for securing the panning clamp 10 to a plate or other member. Also, the central opening 74 may be used to secure the panning clamp 10 to a plate or other member. FIG. 6 illustrates a pictorial view of an assembled panning clamp 10.

The panning clamp 10 itself preferably only includes the ability for rotational movement, and not the ability to rotate, in order to ensure accurate panning. It is to be understood that the rotational movement preferably has some reasonable amount of friction at all times so that the panning clamp 10 does not rotate without some reasonable pressure being exerted. In this manner, even without the panning function being locked the panning clamp 10 will not tend to rotate without the user=s turning of the clamp body 14. In addition, the panning clamp 10 should have a height that is less than 50% of the diameter of the panning clamp 10.

Figure 7:
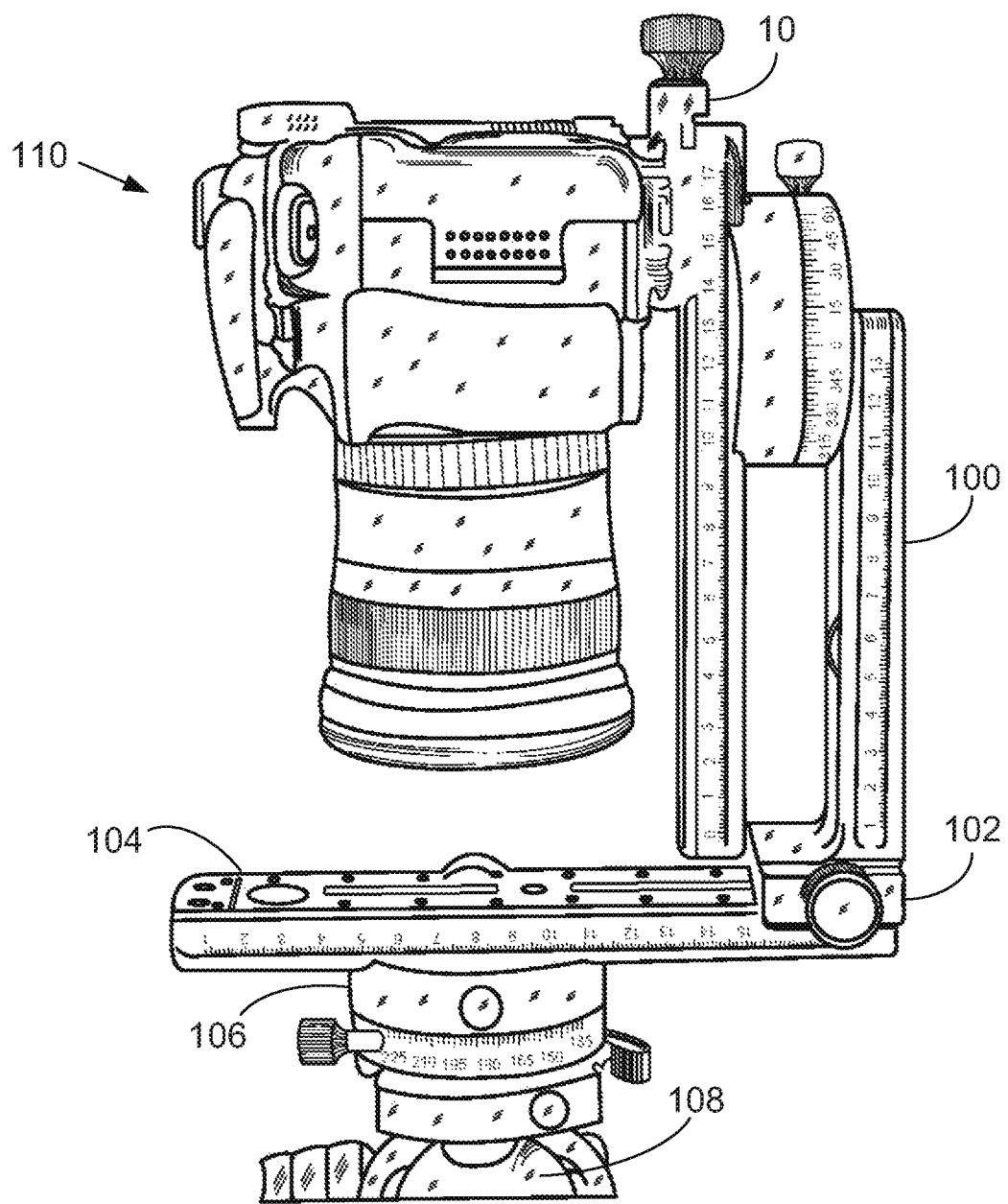
FIG. 7 illustrates a panning assembly in a first position.
Figure 8:
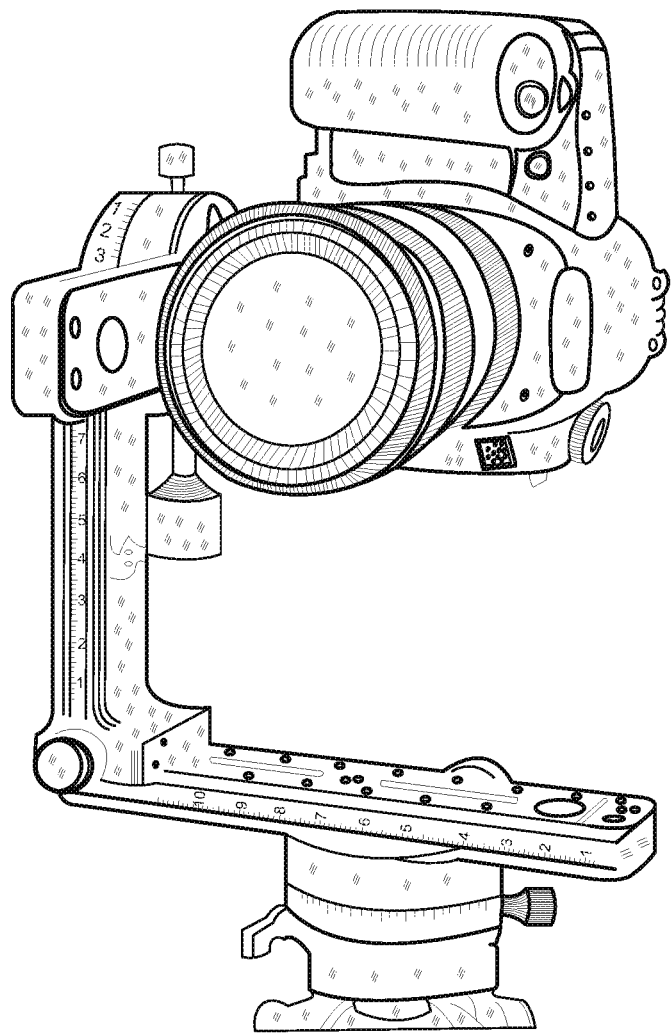
FIG. 8 illustrates a panning assembly in a second position.
Figure 9:
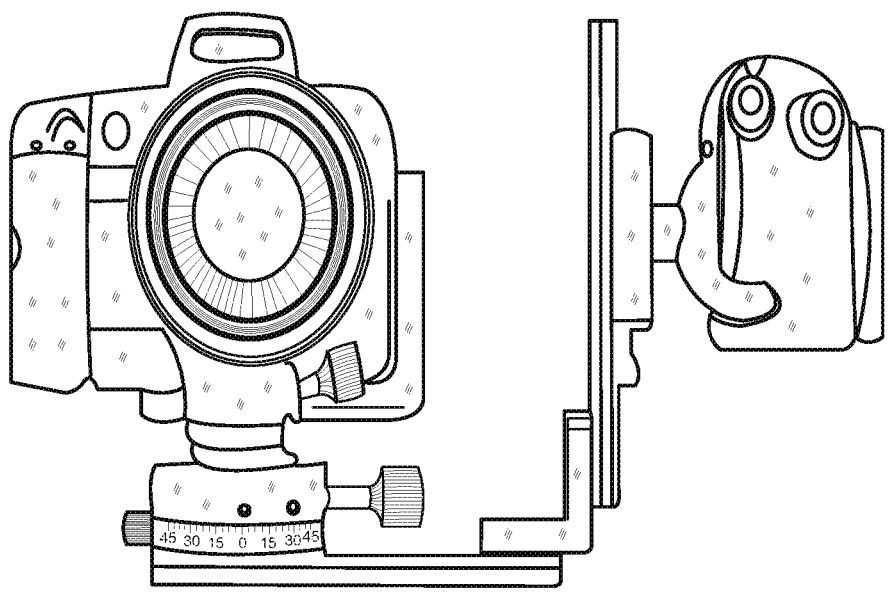
FIG. 9 illustrates a panning assembly in a third position.
Figure 10:
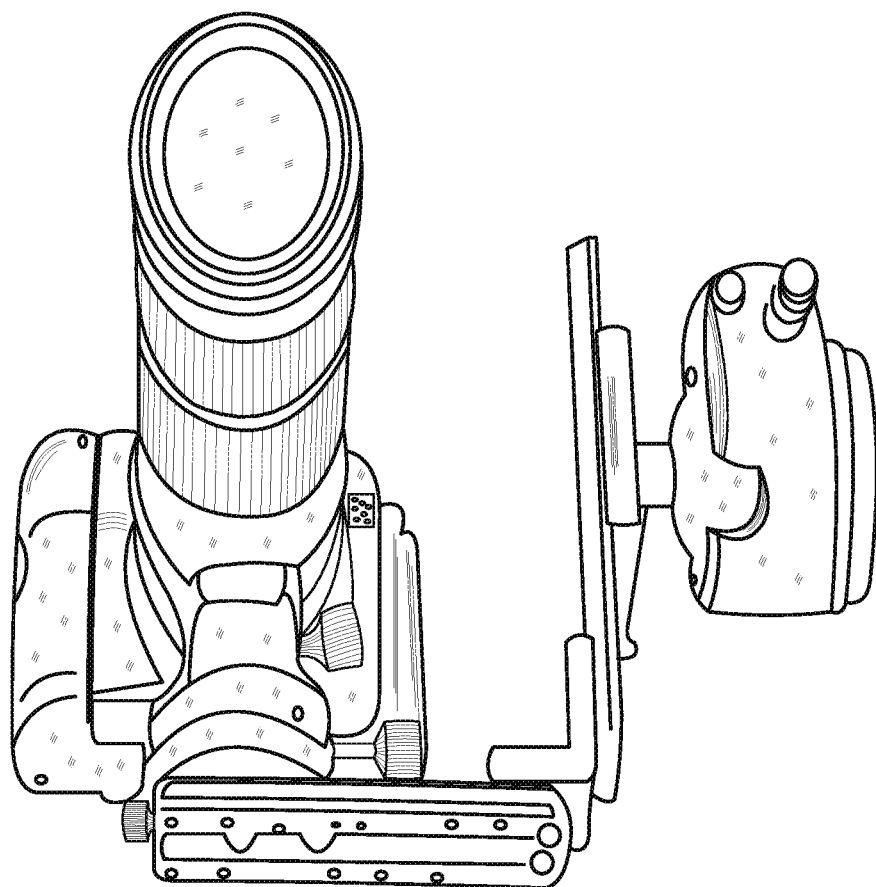
FIG. 10 illustrates a panning assembly in a fourth position.
Figure 11:
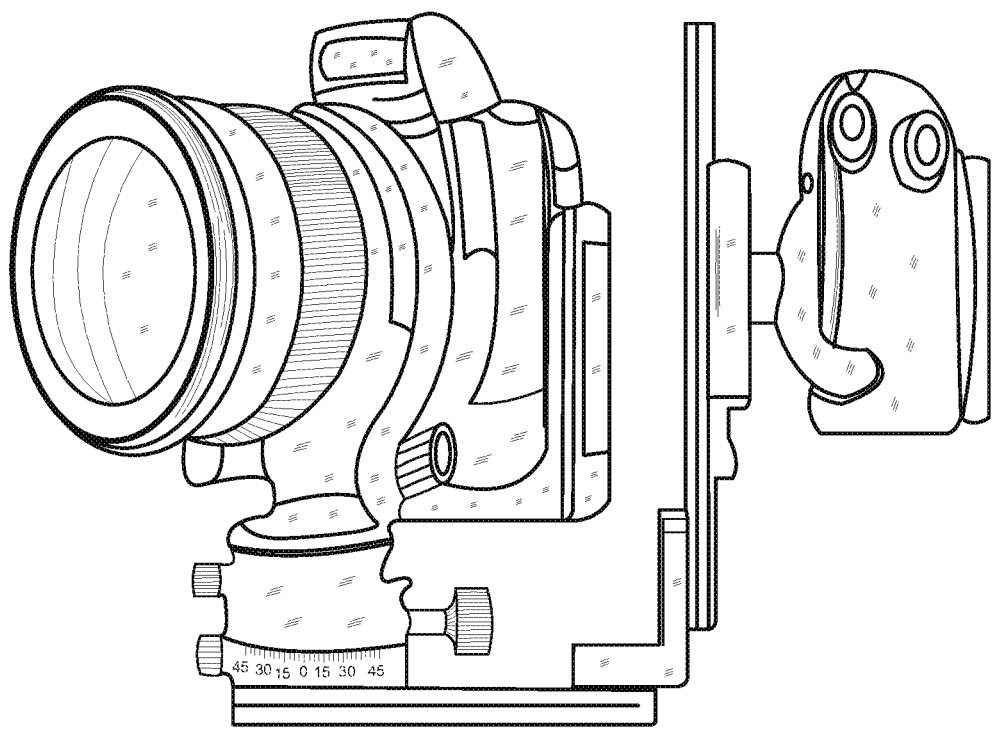
FIG. 11 illustrates a panning assembly in a fifth position.

Referring to FIG. 7, a camera 110 may be supported by the panning clamp 10. The panning clamp 10 permits selective rotational movement of the camera 110. The panning claim 10 is supported by a bracket 100. The bracket 100 is supported at a 90 degree (or substantially 90 degrees) angle with respect to a bracket 104 by an AL@ shaped bracket 102. The bracket 104 is detachable engageable to a clamp 106 supported by a ball head 108. FIGS. 8, 9, 10, and 11 illustrate other orientations for the camera 110.

Figure 13:
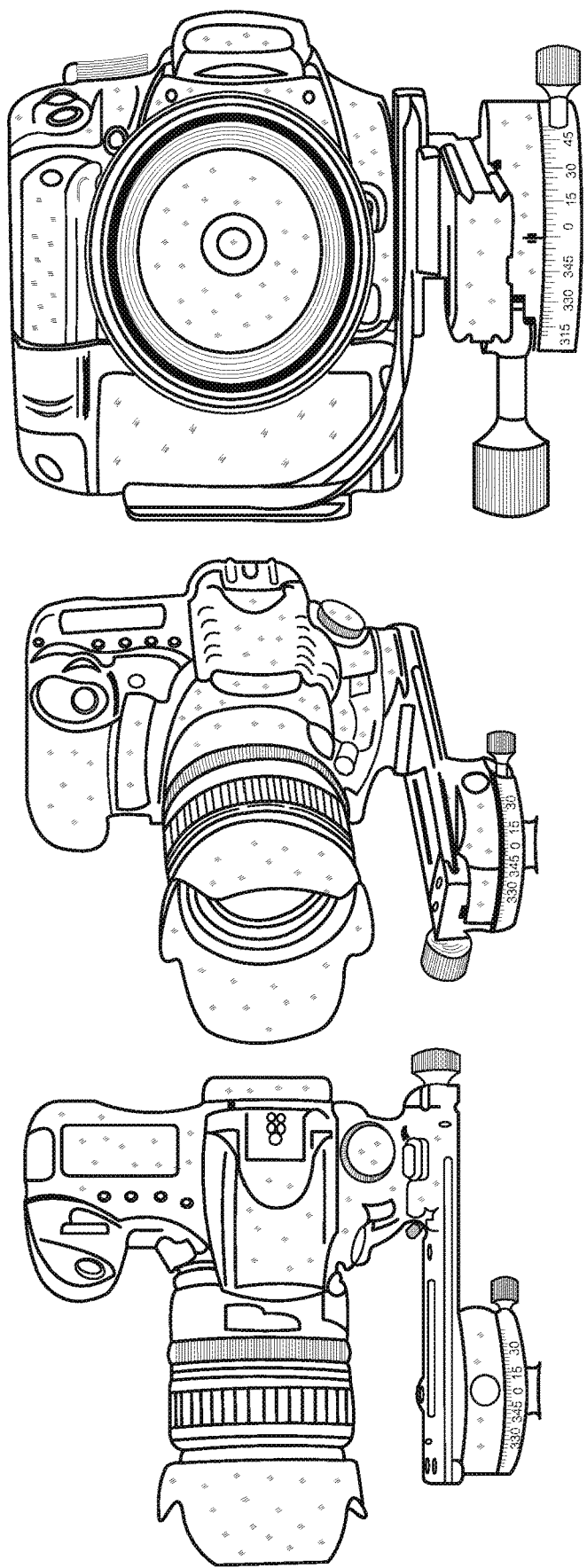
FIG. 13 illustrates a panning assembly in a sixth position.
Figure 14:
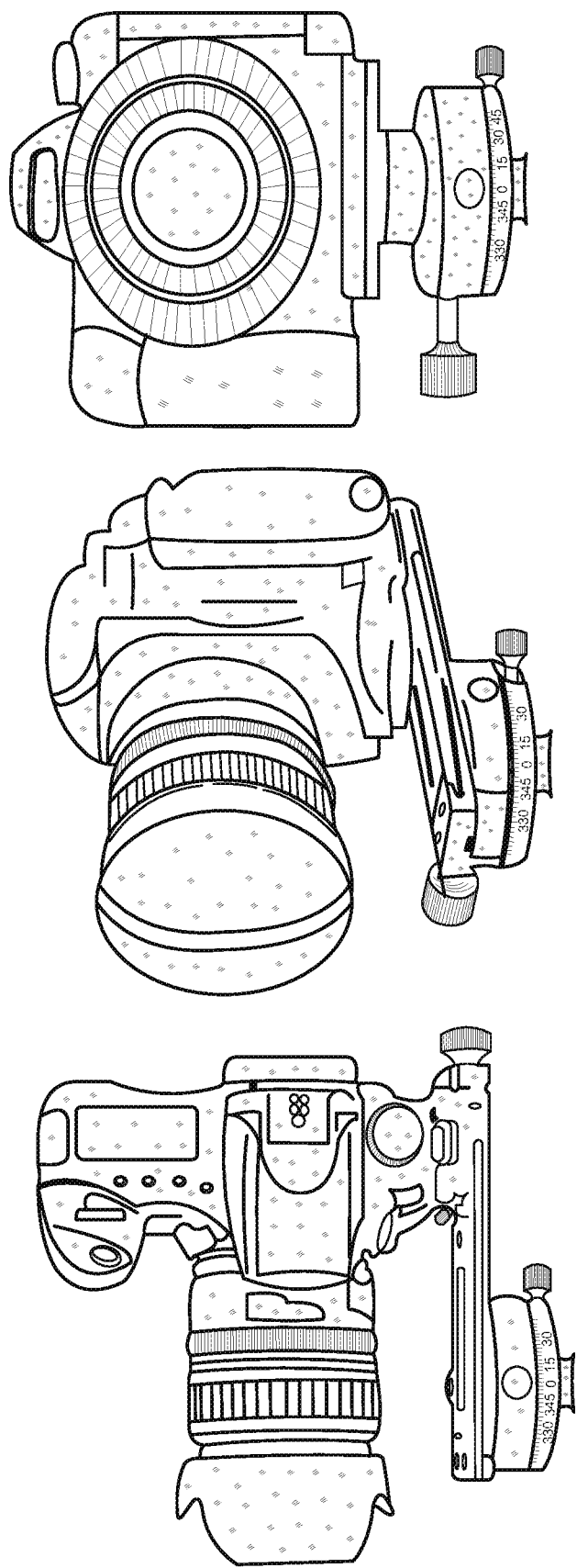
FIG. 14 illustrates a panning assembly in a seventh position.
Figure 15:
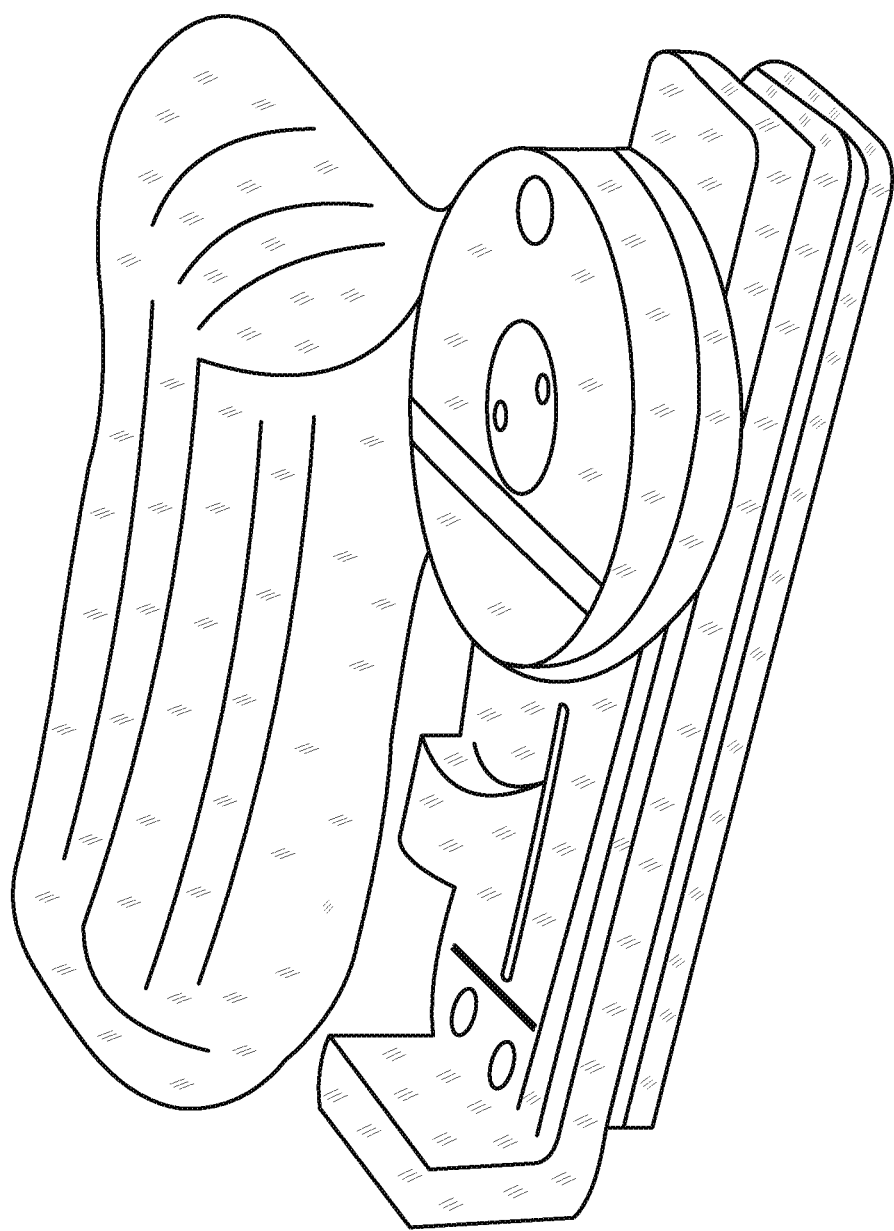
FIG. 15 illustrates a panning assembly in a disassembled arrangement.

Referring to FIG. 12, the bracket 100 may include a clamp mechanism 125 at one end thereof along with a notch 127 along both of its sides. Other types of brackets may likewise be used, as desired. Referring to FIG. 13, the camera, bracket, and panning clamp illustrate the proper positioning of the camera in a vertical position with respect to axis of rotation of the panning clamp. Referring to FIG. 14, the camera, bracket, and panning clamp illustrate the proper positioning of the camera in a horizontal position with respect to axis of rotation of the panning clamp. Referring to FIG. 15, a compact assembly may include a pair of brackets 100, 104, an AL@ shaped bracket 102, and a panning clamp 10, all arranged in a stacked manner so that they are readily stored in a rectangular pouch 133.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:
1. An integrated panoramic device comprising:
 (a) a base having a lower surface suitable for supporting said base;
 (b) a first clamp member secured for rotation to said base and comprising a first clamp surface rotatable about a single axis substantially normal to said lower surface, said panoramic device being free from and incapable of said first clamp surface being rotatable about an axis other than said single axis substantially normal to said lower surface;
 (c) a second clamp member including a second clamp surface slidably secured to said first clamp member and movable as a result of movement of a first member to approach said second clamp surface relative to said first clamp surface to clamp an article therebetween and movable as a result of movement of said first member to separate said second clamp surface relative to said first clamp surface to release an article clamped between said first clamp surface and said second clamp surface;
 (d) a second member as a result of movement to selectively impede relative rotation of said first clamp member and said base, said first clamp member and said second clamp member not releasable from said base by movement of said second member, said first clamp member rotatable through 360 degrees with respect to said base; and
 (e) wherein said first member is engaged with said first clamp member, wherein said first member extends within at least a portion of said second clamp member.

2. The panoramic device of claim 1 further comprising a bias mechanism that biases said second clamp member away from said first clamp surface.

3. The panoramic device of claim 2 wherein said bias mechanism includes at least one spring.

4. The panoramic device of claim 2 wherein said bias mechanism includes at least two springs.

5. The panoramic device of claim 1 further comprising a sleeve surrounding a portion of said first member.

6. The panoramic device of claim 1 further comprising a knob attached to said first member.

7. The panoramic device of claim 1 further comprising a level bubble visible at an upper surface of said panoramic device.

8. The panoramic device of claim 7 wherein said level bubble is approximately flush with an upper surface of said panoramic device.

9. The panoramic device of claim 1 wherein said second member is engaged with said base.

10. The panoramic device of claim 9 wherein said second member includes a knob attached thereto.

11. The panoramic device of claim 1 wherein said second member selectively impedes said relative rotation as a resolute of rotating said second member.

12. The panoramic device of claim 1 wherein said first clamp member includes an upper surface having a plurality of different elevations.

13. The panoramic device of claim 1 wherein said base defines a circular peripheral edge.

14. The panoramic device of claim 13 wherein said base defines a circular exterior surface.

15. The panoramic device of claim 14 wherein said circular exterior surface and said circular peripheral edge of said base are aligned with a second circular exterior surface of said first clamp member.

16. The panoramic device of claim 15 further comprising a level bubble visible at an upper surface of said panoramic device.

17. The panoramic device of claim 16 wherein said level bubble is approximately flush with said upper surface of said panoramic device.

18. The panoramic device of claim 1 further comprising a level bubble.

19. The panoramic device of claim 1 wherein first clamp member defines a circular peripheral edge.

20. The panoramic device of claim 19 wherein said first clamp member defines a circular exterior surface.

21. The panoramic device of claim 20 wherein said first clamp member defines an opening in a center of said first clamp member.

22. The panoramic device of claim 1 wherein said base defines a first circular exterior surface and said first clamp member defines a second circular exterior surface, and said first circular exterior surface is aligned with said second exterior surface.

23. The panoramic device of claim 22 further comprising a level bubble visible at an upper surface of said panoramic device.

24. The panoramic device of claim 23 wherein said level bubble is approximately flush with said upper surface of said panoramic device.

* * * * *

UNITED STATES PATENT AND TRADEMARK OFFICE
CERTIFICATE OF CORRECTION

PATENT NO. : 10,768,510 B2
APPLICATION NO. : 16/731513
DATED : September 8, 2020
INVENTOR(S) : Johnson, Sr.

It is certified that error appears in the above-identified patent and that said Letters Patent is hereby corrected as shown below:

In the Specification

At Column 3, Line 37: Replace "user=s" with --user's--;

At Column 3, Line 45: Replace "an AL@ shaped" with --an L-shaped--; and

At Column 3, Line 60: Replace "an AL@ shaped" with --an L-shaped--.

Signed and Sealed this
Thirty-first Day of May, 2022

Katherine Kelly Vidal
*Director of the United States Patent and Trademark Office*